United States Patent
Persson et al.

(10) Patent No.: US 8,055,296 B1
(45) Date of Patent: Nov. 8, 2011

(54) HEAD-UP DISPLAY COMMUNICATION SYSTEM AND METHOD

(75) Inventors: Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 703 days.

(21) Appl. No.: 11/936,074

(22) Filed: Nov. 6, 2007

(51) Int. Cl.
*H04M 1/00* (2006.01)

(52) U.S. Cl. ............. 455/556.1; 455/456.1; 455/456.2; 455/457

(58) Field of Classification Search ....... 455/456.1–457; 345/7–9
See application file for complete search history.

(56) References Cited

U.S. PATENT DOCUMENTS

| | | | |
|---|---|---|---|
| 3,848,974 A | 11/1974 | Hosking et al. | |
| 6,452,544 B1 | 9/2002 | Hakala et al. | |
| 6,526,352 B1 | 2/2003 | Breed et al. | |
| 6,900,731 B2 | 5/2005 | Kreiner et al. | |
| 7,091,852 B2 * | 8/2006 | Mason et al. | 340/539.13 |
| 7,245,216 B2 * | 7/2007 | Burkley et al. | 340/539.13 |
| 7,305,102 B2 | 12/2007 | Nagasaki | |
| 2003/0064718 A1 * | 4/2003 | Haines et al. | 455/423 |
| 2003/0076980 A1 | 4/2003 | Zhang et al. | |
| 2003/0222892 A1 | 12/2003 | Diamond et al. | |
| 2004/0082341 A1 * | 4/2004 | Stanforth | 455/456.1 |
| 2005/0048918 A1 * | 3/2005 | Frost et al. | 455/41.2 |
| 2005/0090201 A1 * | 4/2005 | Lengies et al. | 455/41.2 |
| 2005/0137786 A1 | 6/2005 | Breed et al. | |
| 2005/0181806 A1 * | 8/2005 | Dowling et al. | 455/456.1 |
| 2005/0200478 A1 | 9/2005 | Koch et al. | |
| 2006/0079187 A1 | 4/2006 | Struck | |
| 2006/0103590 A1 | 5/2006 | Divon | |
| 2006/0158329 A1 * | 7/2006 | Burkley et al. | 340/539.13 |
| 2007/0067104 A1 | 3/2007 | Mays | |
| 2007/0086764 A1 | 4/2007 | Konicek | |
| 2007/0132663 A1 * | 6/2007 | Iba et al. | 345/8 |
| 2007/0173266 A1 * | 7/2007 | Barnes, Jr. | 455/456.1 |
| 2007/0220108 A1 | 9/2007 | Whitaker | |
| 2008/0055194 A1 | 3/2008 | Baudino et al. | |
| 2008/0088527 A1 | 4/2008 | Fujimori et al. | |
| 2008/0089587 A1 | 4/2008 | Kim et al. | |
| 2009/0011799 A1 * | 1/2009 | Douthitt et al. | 455/569.1 |
| 2010/0029296 A1 * | 2/2010 | Noonan et al. | 455/456.1 |

OTHER PUBLICATIONS

Ng, Sei Y., et al., "Distribution Center Head-up Display", filed Aug. 3, 2007, U.S. Appl. No. 11/833,758.

Persson, Carl J., et al., "Head-up Security Display", filed Aug. 3, 2007, U.S. Appl. No. 11/833,747.

Persson, Carl J., et al., "Safe Head-up Display of Information", filed Nov. 8, 2007, U.S. Appl. No. 11/937,488.

(Continued)

*Primary Examiner* — Fayyaz Alam

(57) ABSTRACT

A system is provided for communication between mobile devices. The system includes an audio device, a transparent display, and a mobile device in communication with the audio device and the transparent display. The mobile device receives a request for information associated with other mobile devices, and determines a location of the mobile device. The mobile device also outputs a spatial map of the information to the transparent display, wherein the information includes locations of the other mobile devices relative to the location of the mobile device. Additionally, the mobile device communicates with at least one of the other mobile devices.

20 Claims, 8 Drawing Sheets

OTHER PUBLICATIONS

Office Action dated Sep. 23, 2008, U.S. Appl. No. 11/833,758 (19 pgs.).

Final Office Action dated Mar. 13, 2009, U.S. Appl. No. 11/833,758 (25 pgs.).

Advisory Action dated May 21, 2009, U.S. Appl. No. 11/833,758 (4 pgs.).

Examiner's Answer dated Nov. 25, 2009, U.S. Appl. No. 11/833,758 (25 pgs.).

Office Action Restriction dated Aug. 16, 2011, U.S. Appl. No. 11/833,747.

Office Action dated Aug. 22, 2011, U.S. Appl. No. 11/937,488.

* cited by examiner

HEAD-UP DISPLAY COMMUNICATION SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Workers may use communication devices to communicate with coworkers to request information, such as the sale price for an item or the location where the item may be found. However, these communication devices can be inefficient because they require the use of at least one of the worker's hands and may also require the worker to look away from a customer. Additionally, when a worker needs to request assistance, the worker may not know where all coworkers are located, which coworkers are busy with other customers, which coworkers are on break, which coworkers have the skills to provide the specific assistance needed, or which coworkers are working in the area associated with the request. This lack of knowledge makes efficient responses to requests more difficult. All of the coworkers who hear a general request for assistance may assume that one of the other coworkers who heard the request may be responding, resulting in no coworkers responding to the request. Supervisors of workers may not be able to evaluate which workers have the highest response rates or which workers most effectively responded to requests for assistance in their areas.

SUMMARY

In some embodiments, a system is provided for communication between mobile devices. The system includes an audio device, a transparent display, and a mobile device in communication with the audio device and the transparent display. The mobile device receives a request for information associated with other mobile devices, and determines a location of the mobile device. The mobile device also outputs a spatial map of the information to the transparent display, wherein the information includes locations of at least one of the other mobile devices. Additionally, the mobile device communicates with at least one of the other mobile devices.

In other embodiments, a method is provided for communication between mobile devices. A primary mobile device is used to receive information associated with other mobile devices. A location of the primary mobile device is determined. A spatial map of the information is output to a transparent display via the primary mobile device, wherein the information is based on the locations of the other mobile devices relative to the location of the primary mobile device. The primary mobile device is used to communicate with at least one of the other mobile devices.

In still other embodiments, a method is provided for communicating with other users. A spatial map of information is output to a transparent display, wherein the information is based on the locations of other mobile devices used by each of the other users relative to the location of the primary mobile device. The primary mobile device is used to select to communicate with at least one of the other mobile devices. The primary mobile device is used to communicate an assignment of the task to at least one user of the other mobile devices.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for communication between mobile devices in an environment, such as a retail store, a distribution center, a warehouse, and other environments. The system includes a mobile device in communication with an audio device and a transparent display. A mobile device user can orally submit a request for information through the audio device, leaving the user's hands free for other tasks. The mobile device outputs the information to the transparent display, which can project images on a lens worn by the user, such that the user does not have to look down or away from items, customers, or coworkers to see the information. The information can include a map that identifies the location of other mobile devices worn by other users and other menu options that the user can select. The map may display where coworkers are located, which coworkers are busy with other customers, which coworkers are on break, which coworkers have the skills to provide the specific assistance needed, and which coworkers are working in the area associated with the request. If the user specifies multiple ranges for locating coworkers, the map may simultaneously display the locations of coworkers located within each of the specified ranges.

Figure 1:
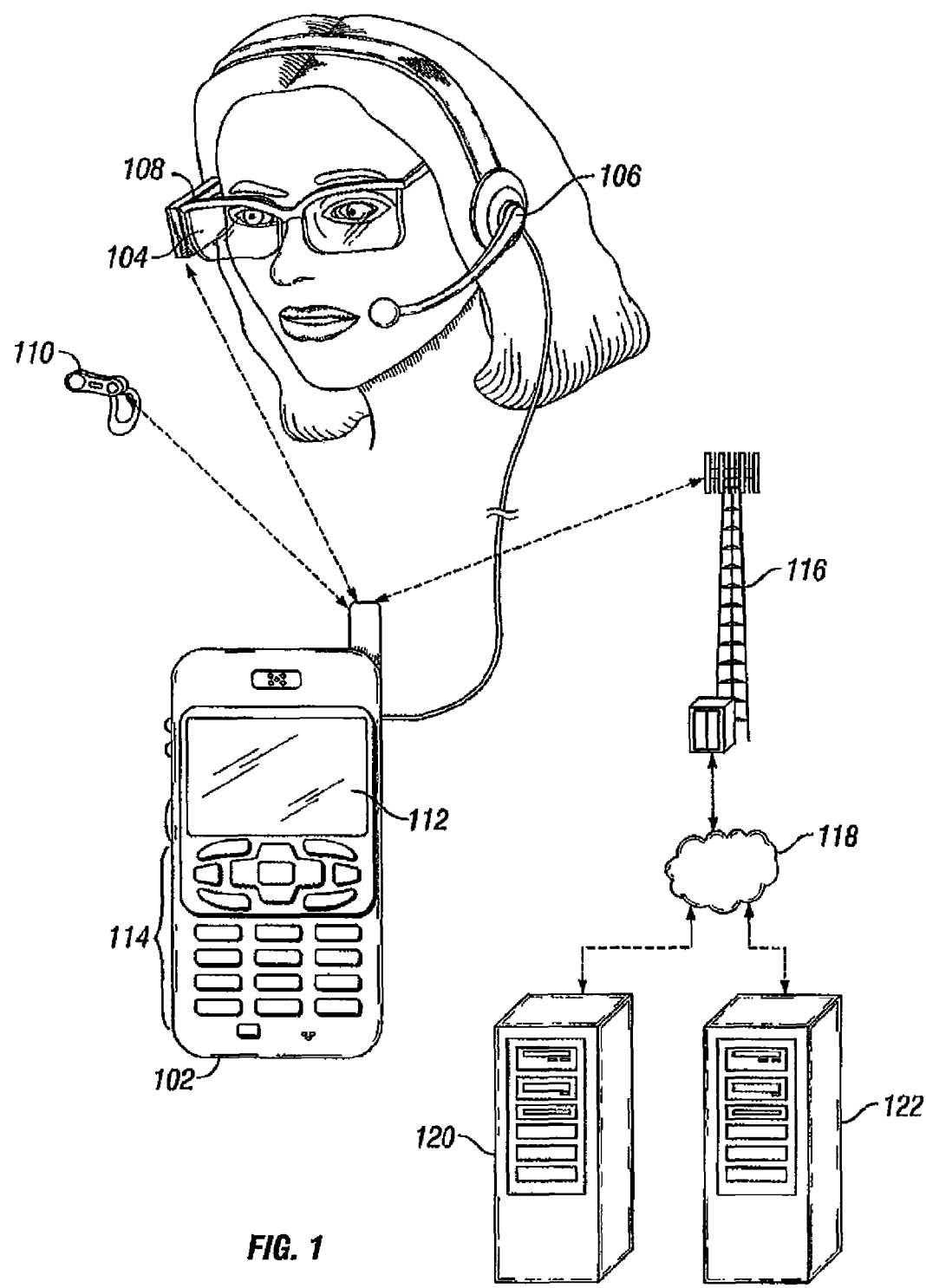
FIG. 1 illustrates a wireless communications system for communication between mobile devices according to some embodiments of the present disclosure.

The user may select communication with coworkers based on the information in the map. The user may capture images of items with a camera that communicates with the mobile device, so that the mobile device can send the image to users of other mobile devices to provide assistance in identifying the item. The user may also assign a task to a coworker based on the map, and communicate this assignment to all of the other coworkers so that they will know that they are not responsible for the assigned task. The assignment may be made to a specific coworker, or to whichever coworker responds first to an audio or text request for assistance. Furthermore, the mobile device may assign a task to a coworker whose mobile device is in or enters an area associated with the task. A server may store the data that indicates the location of each mobile device when each request for assistance was made, which mobile devices responded to the requests, and when the responses were made. Supervisors of workers may use such stored data to evaluate which workers have the highest response rates and which workers most effectively responded to requests for assistance in their areas FIG. 1 shows a wireless communications system including the mobile device 102. FIG. 1 depicts the mobile device 102, which is operable for implementing aspects of the present disclosure, but the present disclosure should not be limited to these implementations. Although illustrated as a mobile phone, the mobile device 102 may take various forms including a wireless mobile device, a pager, a personal digital assistant (PDA), a portable computer, a tablet computer, or a laptop computer. Many suitable mobile devices combine some or all of these functions. In some embodiments of the present disclosure, the mobile device 102 is not a general purpose computing device like a portable, laptop or tablet computer, but rather is a special-purpose communications device such as a mobile phone, wireless mobile device, pager, or PDA. The mobile device 102 may support specialized activities such as gaming, inventory control, job control and/or task management functions, and so on.

The mobile device 102 can communicate with a transparent display 104 and an audio device 106. The transparent display 104, which can function as a head-up display, includes a user wearable lens and a projector 108 to project images on the lens. The mobile device 102 can output content to the transparent display 104 that is projected as virtual images on the lens. The virtual or see-through images overlay the user's view of reality. The mobile device 102 can also project the content to the transparent display's 104 side panes that the user can conveniently view without any head movement by the user. The audio device 106 includes a microphone to input the user's audio signals and a speaker to output audio signals to the user. The audio device 106 may be a headset, an earpiece with a microphone, or any similar device that combines a speaker with a microphone. The mobile device 102 can also communicate with a camera 110 that can capture images of items viewed through the transparent display 104. Because the camera 110 can be located near the transparent display's 104 projector 108, the camera 110 can provide feedback to the mobile device 102 regarding what the user can see. The camera 110 feedback can include the viewer's orientation, such as facing due north in a bookstore that is oriented from south to north.

The mobile device 102 may include a display 112 and a touch-sensitive surface or keys 114 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example, from a wireless base station, a wireless access point, or a peer mobile device 102.

The mobile device 102 may execute a web browser application which enables the display 112 to show a web page. The web page may be obtained via wireless communications with a cell tower 116, a wireless network access node, a peer mobile device 102, or any other wireless communication network or system. The cell tower 116 (or wireless network access node) is coupled to a wired network 118, such as the Internet. Via the wireless link and the wired network, the mobile device 102 has access to information on various servers, such as a communication server 120 and a content server 122. The content server 122 may provide content that may be shown on the display 112. Alternately, the mobile device 102 may access the cell tower 116 through a peer mobile device 102 acting as an intermediary, in a relay type or hop type of connection. The content server 122 can include a database, such as a database for items that can be stored in a retail store, for locations in the retail store, and for applications that can promote determining item locations in the retail store.

Figure 2:
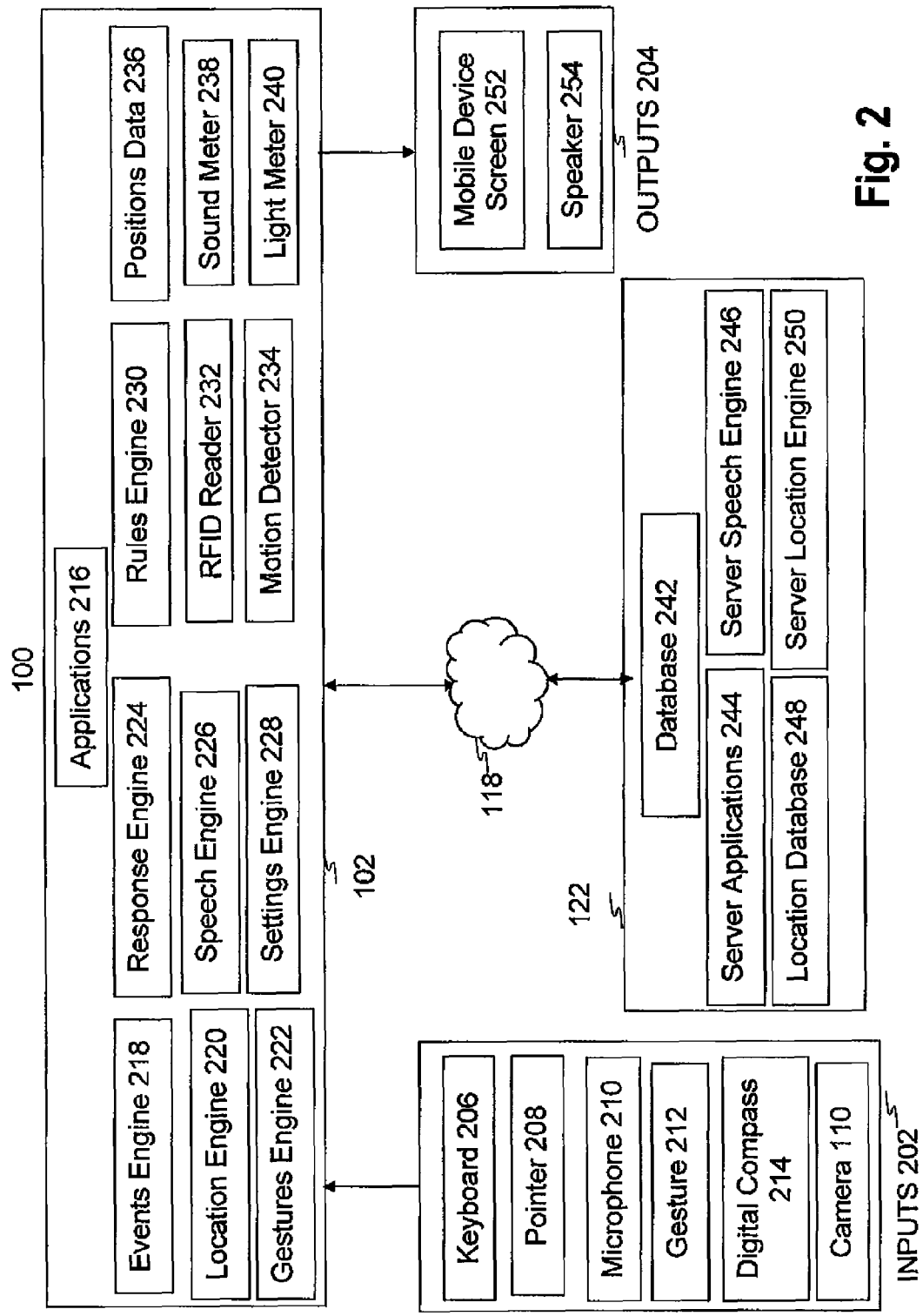
FIG. 2 shows a block diagram of an illustrative wireless communications system for communication between mobile devices.

FIG. 2 is a block diagram illustrating the wireless communications system 100 for communication between mobile devices 102 according to some embodiments of the present disclosure. The system includes inputs 202 to and outputs 204 from the mobile device 102. The inputs 202 can be via a keyboard 206, a pointer 208, a microphone 210, a gesture 212 input, a digital compass 214, and the camera 110. For example, a supervisor of the user can enter a text message via the keyboard 206, which can be a computer keyboard in communication with the content server 122. The text message can be communicated to the mobile device 102, and projected on the transparent display 104 or output as an audio signal via the audio device 106. Additionally, the supervisor can select messages through the pointer 208, which can be a computer mouse or similar input device in communication with the content server 122. The user can speak into the microphone 210 on the audio device 106 to request information via the mobile device 102.

The user can enter a gesture 212 input to the mobile device 102 by aligning the user's finger with an option projected on the transparent display 104. The camera 110 captures an image, for example, of the finger and its location, which can be identified as aligned with the option projected on the transparent display 104. The mobile device 102 can process the gesture 212 input by executing the option selected by the user's finger. The digital compass 214 is on the transparent display 104, and is a multi-axis sensor that can determine not only the heading, but also the roll and the pitch for the transparent display 104. The digital compass 214 inputs information to the mobile device 102 to identify the transparent display's 104 orientation, and hence the view of the user. For example, if the user's head is facing directly northeast, directly toward the horizon and without any tilt, the digital compass 214 inputs the orientation to the mobile device 102. The orientation information enables the mobile device 102 to project images on the transparent display 104 as transparent overlays on items whose images are captured by the camera 110. For example, when the user is looking for a specific item in a retail store, the camera 110 can capture an image of the item that is recognized by the mobile device 102. The mobile device 102 can respond by outputting a transparent overlay on the transparent display 104, based on the orientation information, which identifies the specific item to the user.

The mobile device 102 can include components 216 to 240 that can assist a user in requesting and receiving information. The components 216 to 240 can include applications 216, an events engine 218, a location engine 220, a gestures engine 222, a response engine 224, a speech engine 226, a settings engine 228, a rules engine 230, a radio frequency identifier (RFID) reader 232, a motion detector 234, positions data 236, a sound meter 238, and a light meter 240. The applications 216 can provide interfaces between the mobile device 102, the inputs 202, the outputs 204, and the content server 122. The events engine 218 can determine when to send some of the outputs 204 based on periodic events, such as an hourly text message of the user's frequency in responding to requests for assistance. The location engine 220 can promote inputting a request for an item location, determining the item location, and outputting item location information. The location engine 220 can also store item location information. The gestures engine 222 can recognize the significance of the gesture 212 input as captured by the camera 110 and determine the response to the gesture 212 input.

The response engine 224 can execute the appropriate response for a gesture 212 input or other inputs 202. The speech engine 226 can convert audio signals input via the microphone 210 on the audio device 106 and execute speech recognition software to determine the appropriate response to the audio signal. For example, when the user says "display staff within 50 feet," the microphone 210 inputs this audio signal and the speech engine converts the audio signal to a request to display the location of mobile devices for coworkers whose locations are determined to be within 50 feet of the user. The speech engine 226 can also execute speech recognition software to convert audio information to text, such as converting oral comments recorded by one mobile device user to text projected on the transparent display of another mobile device user. The settings engine 228 can keep track of settings for the mobile device 102, such as the intensity of images projected on the transparent display 104 and whether speech input is enabled.

The rules engine 230 can specify the procedure used in requesting information, such as referencing the location engine 220 on the mobile device 102 before accessing any location database located elsewhere. The RFID reader 232 is an electronic tag reader that can detect a RFID signal from an item's RFID tag and determine the item's identity based on the RFID signal. The RFID reader 232 can be used to associate any additional information with the RFID tag of the item. The motion detector 234 can function as a pedometer to assist in determining the location of the mobile device 102, such as when a user walks in a retail store.

The positions data 236 can assist the mobile device 102 in determining item location information based on the position of other mobile devices relative to the position of the mobile device 102 and the position of any fixed locations in a business location, such as a distribution center or a retail store.

The sound meter 238 can evaluate the audio signal via the microphone 210 to determine when background sounds are so loud that the speech engine 226 will have difficulty with speech recognition or the user will have difficulty hearing outputs via the audio device 106. The light meter 240 can evaluate the distribution center's light via the camera 110 to determine when the light is so bright that the camera 110 will have difficulty identifying items, images, and gestures, or the user will have difficulty viewing outputs via the transparent display 104.

The content server 122 can include a database 242, server applications 244, a server speech engine 246, a location database 248, and a server location engine 250 to assist the mobile device 102 in determining the location of items and other users' mobile devices. The database 242 can store captured images of items to assist the user of the mobile device 102 to identify an item as the requested item. The server application 244 can provide interfaces between the mobile device 102 and the content server 122.

The server speech engine 246 can convert audio signals input via the microphone 210 and execute speech recognition software to determine the appropriate response to the audio signal. The locations database 248 can store location information about items and other users' mobile devices. The server location engine 250 can input a request for the locations of items or other users' mobile devices, determine the locations, and output location information. The functions of recognizing speech, storing location information, and determining locations can be implemented on the mobile device 102, the content server 122, or a combination of the mobile device 102 and the content server 122. In other embodiments, some of the components 216 to 240 can be implemented on the content server 122 and some of the components 242 to 250 can be implemented on the mobile device 102.

The outputs 204 include a mobile device screen 252 and a speaker 254. The mobile device screen 252 is the graphical output for the transparent display 104. The speaker 254 is the audio output for the audio device 106.

Figure 3:
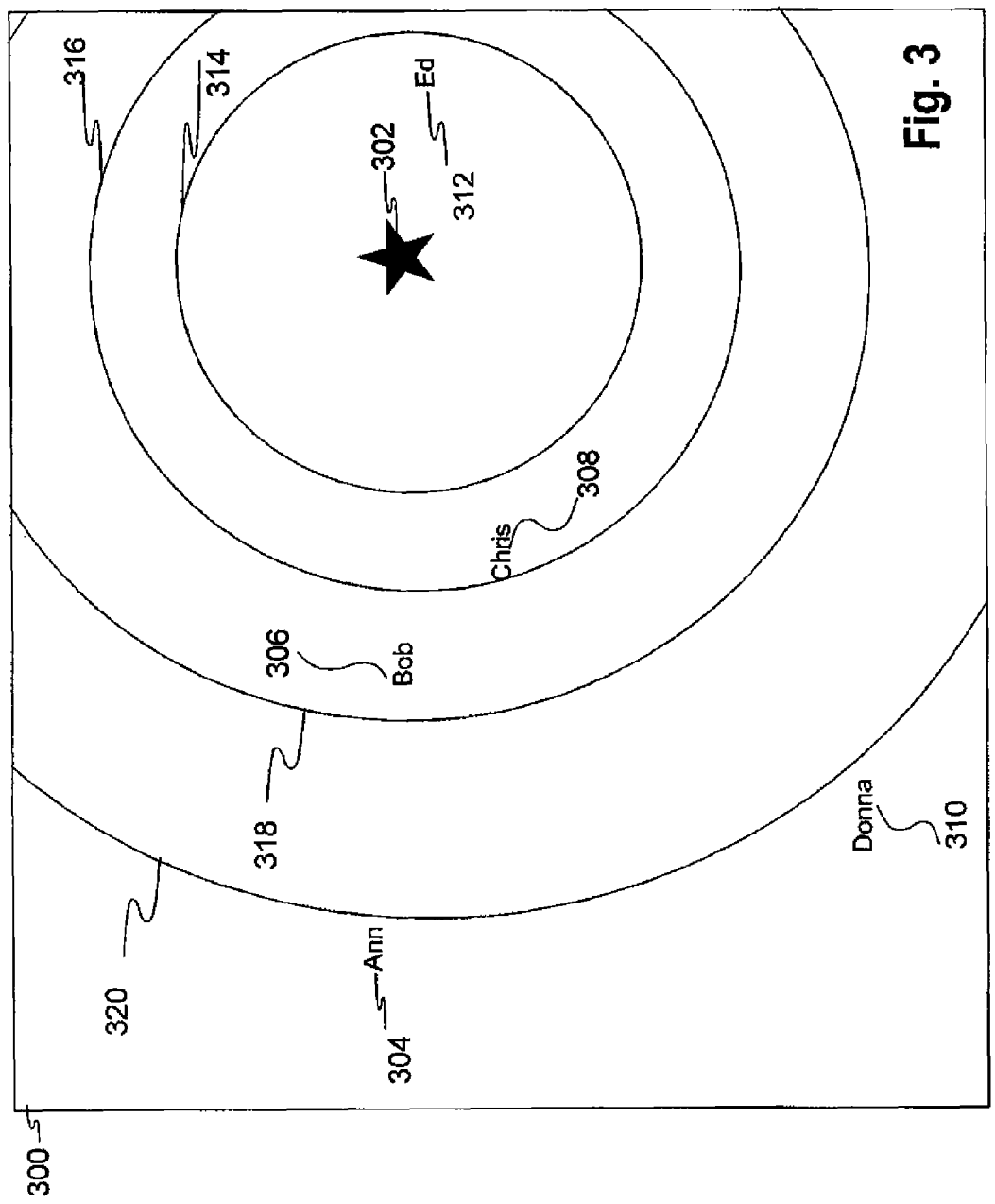
FIG. 3 shows a first graphical user interface for communication between mobile devices according to some embodiments of the present disclosure.

FIG. 3 shows a first graphical user interface 300 for communication between mobile devices 102 according to some embodiments of the present disclosure. The first graphical user interface 300 is projected on the transparent display 104, and includes locations 302-312 associated with mobile devices 102. A star 302 identifies the location of the mobile device 102 associated with the user, Ann's location 304 identifies the location of the mobile device 102 associated with a coworker named Ann, and Bob's location 306 identifies the location of the mobile device 102 associated with a coworker named Bob. Similarly, Chris' location 308 identifies the location of the mobile device 102 associated with a coworker named Chris, Donna's location 310 identifies the location of the mobile device 102 associated with a coworker named Donna, and Ed's location 312 identifies the location of the mobile device 102 associated with a coworker named Ed. The first graphical user interface 300 also includes ranges 314-320 of distance to the user's location 302. Range 314 is 25 feet from the user's location 302, range 316 is 35 feet from the user's location 302, range 318 is 50 feet from the user's location 302, and range 320 is 70 feet from the user's location 302. The user can view the locations 302-312 and the ranges 314-320 to determine the distance of other mobile devices 102 to the user's location 302. For example, because Ed's location 312 is near the range 314, which is 25 feet from the user's location 302, Ed's location may be approximately 25 feet from the user's location 302.

A user may request information associated with other mobile devices 102 by specifying a maximum distance between the locations associated with the other mobile devices 102 and the location of the user's mobile device 102. For example, if the user requests information associated with other mobile devices 102 within 25 feet of the user's location 302, the first graphical user interface 300 may depict only the user's location 302, the range 314, and Ed's location 312 as the only other location within the range 314. The first graphical user interface 300 may also depict information based on multiple requests. For example, when the user requests information associated with other mobile devices 102 within 25 feet of the user's location 302, the user views only one coworker within the requested range 314. If the user needs more than one coworker for assistance, the user requests information associated with other mobile devices 102 within 35 feet of the user's location 302. In response, the first graphical user interface 300 may depict the user's location 302, the range 314, and Ed's location 312 as the only other location located within the range 314; the range 316 and Chris' location 308 as the only other location located within the range 316. In the example depicted in FIG. 3, the first graphical user interface 300 simultaneously displays four ranges 314-320 and the locations 304-312 within the four ranges 314-320.

Figure 4:
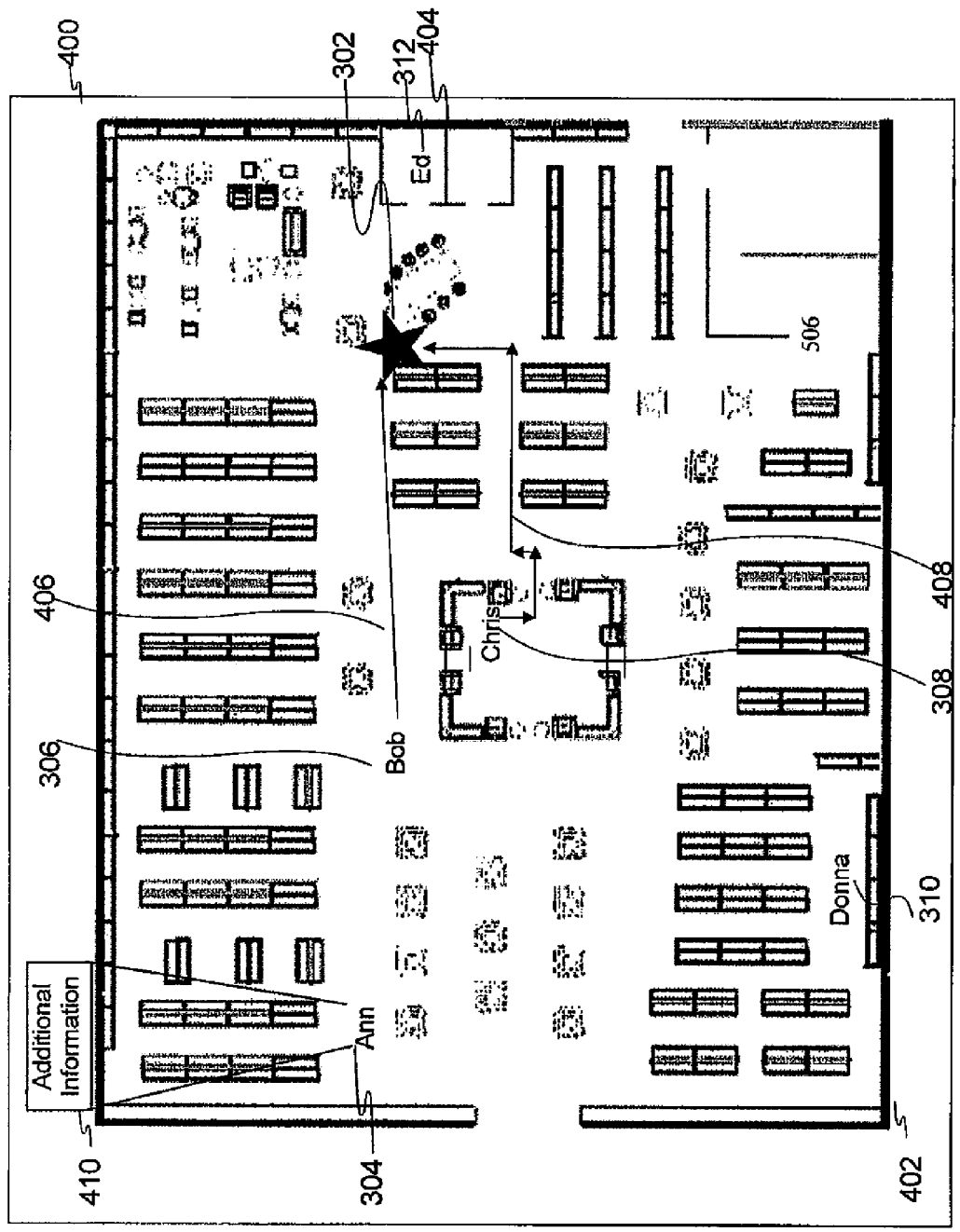
FIG. 4 shows a second graphical user interface for communication between mobile devices according to some embodiments of the present disclosure.

FIG. 4 shows a second graphical user interface 400 for communication between mobile devices 102 according to some embodiments of the present disclosure. The second graphical user interface 400 depicts the locations 302-312 associated with mobile devices 102 within the context of a map 402 for a bookstore. Although the second graphical user interface 400 may also display the ranges 314-320, the ranges 314-320 are not depicted in FIG. 4. The map 402 for the bookstore supplements the locations 302-312 with additional information that may be helpful for the user or the location engine 220.

For example, the map 402 depicts that Ed's location 312 is in a restroom 404, such that the user of the mobile device 102 may decide to request assistance from another coworker who is located further away from the user's location 302 than Ed's location 312. The map 402 may also enable the user or the location engine 220 to determine which coworker to communicate with based on the coworkers' proximities. For example, if the user of the mobile device 102 decides to request assistance from a coworker other than Ed, the user may select Chris as the next closest coworker based on the first graphical user interface 300 in FIG. 3, which indicates that Chris' location 308 is less than 35 feet from the user's location 302 while Bob's location 306 is approximately midway between the range 316 of 35 feet and the range 318 of 50 feet. However, the map 402 depicts the paths between the coworkers and the user's location 302, which indicate that a path 406 between Bob's location 306 and the user's location 302 is direct while a path 408 between Chris' location 308 and the user's location 302 is indirect. If the user of the mobile device 102 requested the coworker Chris to provide assistance at the user's location 302, the path 408 indicates that the coworker Chris may have to go around a counter at a customer service center, between and around a series of bookcases to arrive at the user's location 302. Even though Chris' location 308 may be spatially closer than Bob's location 306 to the user's location 302, the path 408 for the coworker Chris may be longer than the path 406 for the coworker Bob. The location engine 220 may select locations on the map 402 or highlight locations on the map 402 for the user to select.

The map 402 also depicts additional information 410 that is associated with a location of any mobile device 102, such as Ann's location 304. The additional information 410 may include mobile device communication availability, mobile device user function, mobile device user skill level, mobile device user current task, and mobile device user task load. The mobile device communication availability indicates whether a user of one of the other mobile devices 102 has their mobile device 102 in a mode that enables communication, such as when the mobile device 102 is on, or a mode that disables communication, such as when the mobile device 102 is off. The mobile device user function may indicate the job title or position of a user associated with one of the other mobile devices 102, such as trainee, clerk, floor manager, or supervisor. The mobile device user skill level may indicate the capabilities of a user associated with one of the other mobile devices 102, such as level of training on computers, an ability to authorize customer refunds, or a level of knowledge about a specific section of a retail store. The mobile device user current task may indicate that a user associated with one of the other mobile devices 102 is currently responding to a request for assistance from another coworker, whether the user is conducting inventory, or whether the user is on a scheduled break.

The mobile device user task load is an indication of a workload for a user of one of the other mobile devices 102, such as very busy, busy, or waiting. The mobile device user task load can be determined based on a mobile device user conversation detected by another audio device 106 associated with one of the other mobile devices 102 or a user task load selection. For example, when the audio device 106 detects a conversation between a user of the mobile device 102 and a customer for a specified period of time, the mobile device 102 associated with the user modifies the user's task load from waiting to busy. If the audio device 106 detects that the conversation between the user of the mobile device 102 and the customer has been ended for a specified period of time, the mobile device 102 associated with the user modifies the user's task load from busy to waiting. Additionally, a user of the mobile device 102 may modify the mobile device user task load by a user task load selection. For example, when the user of the mobile device 102 begins conducting inventory, the user selects an option presented by a graphical user interface via the mobile device 102 to modify the user's task load from waiting to busy. The user of the mobile device 102 may be able to specify a duration of time before the task load reverts from busy to waiting, or the user may be required to periodically refresh the task load status of busy.

Figure 5:
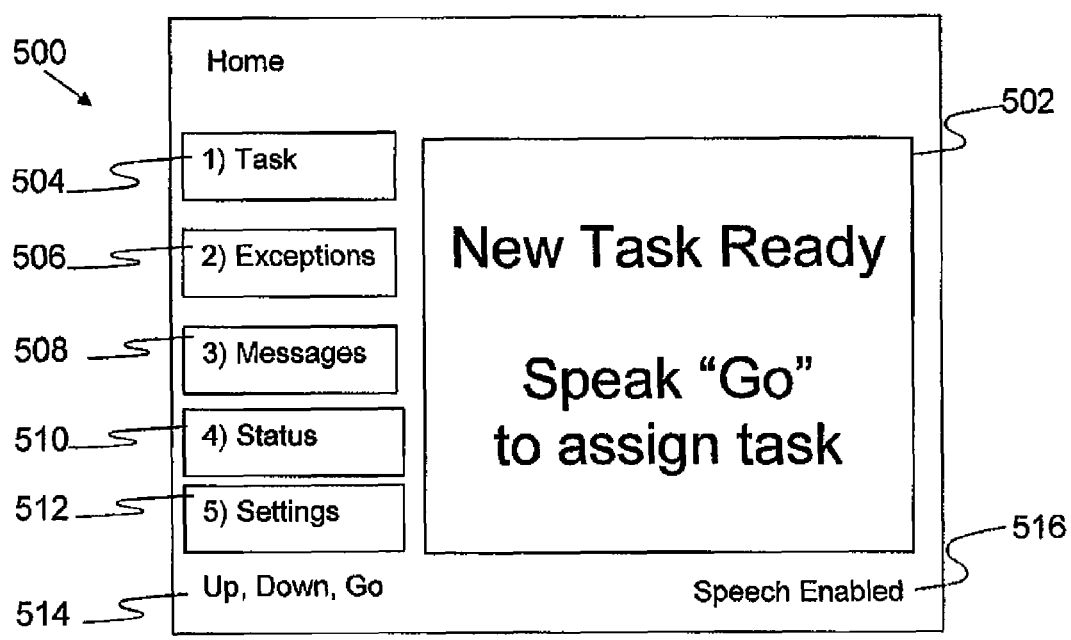
FIG. 5 shows a third graphical user interface for communication between mobile devices according to some embodiments of the present disclosure.

FIG. 5 shows a third graphical user interface 500 for communication between mobile devices 102 according to some embodiments of the present disclosure. The third graphical user interface 500 is projected on the transparent display 104, and can include a text output 502, input options 504 to 512, an input prompt 514, and a communication status 516. For example, the output 502 can be a text message "New task ready, speak 'go' to assign task" that informs the user of the mobile device 102 about a specific spoken command that initiates a specific response. The audio device 106 can detect the user of the mobile device 102 speaking the word "go," and the mobile device 102 can respond to this spoken command by sending a new output to the transparent display 104, with the new output including additional information.

The input options 504 to 512 can include "1) task" 504, "2) exceptions" 506, "3) messages" 508, "4) status" 510, and "5) settings" 512. Each input option can be a text command preceded by a reference numeral, such that the text command can be initiated by either speaking the text command or by speaking the preceding reference numeral that corresponds to the text command. For example, if the user speaks the word "messages" or the reference numeral "3" that corresponds to the text command "messages," the mobile device 102 responds by projecting a supervisor's text message sent to the user as a text output on the transparent display 104.

The input option "1) task" 504 enables the user of the mobile device 102 to assign a specific task to another user. For example, the user assigns the task of troubleshooting a kiosk computer at the user's location 302 to Ann because the additional information 410 indicates that Ann is the only coworker present who is trained to troubleshoot the bookstore's computers. The input option "2) exceptions" 506 enables the user to report an exception, such as reporting that an item is out of stock at the location identified as the item location. Such oral reporting of an out of stock item makes reporting more convenient for the user of the mobile device 102, thereby reducing the possibility that the user forgets to report the out of stock item. Reporting an out of stock item can result in a request to restock the item within a specified timeframe. The input option "3) messages" 508 enables the user of the mobile device to send and receive messages to other distribution system workers. Examples of the messages include "books are un-shelved in the children's section," "need authorization for a customer refund at register 3," or "staff meeting after closing." The input option "4) status" 510 enables the user of the mobile device 102 to request performance information, such as how many requests the user has responded to that day, and how the user's response rate compares to other workers' response rates and the user's response rate goal. The input option "5) settings" 512 enables the user of the mobile device 102 to view and modify system settings, such as enabling speech input and selecting lighter or darker display settings than the mobile device 102 automatically selects based on the light meter 240.

The input prompt 514 projects additional commands that the user of the mobile device 102 can submit orally, such as "up, down, go." For example, after the user of the mobile device 102 has spoken "messages," the text output 502 projects a message from the user's supervisor and the input option "3) messages" 508 remains highlighted. If the user of the mobile device 102 wants to report an exception, the user can speak the command "exceptions" or speak the reference numeral "2" corresponding to the exceptions text command. Additionally, the user of the mobile device 102 can speak the command "up," because the input option "2) exceptions" 506 is projected as one input option up above the input option "3) messages" 508 that is currently highlighted. Similarly, by speaking the command "down," the user of the mobile device 102 can request status information because the input option "4) status" 510 is projected as one input option down below the currently highlighted input option "3) messages" 508.

The communication status 516 projects the status of communication inputs and outputs, such as whether speech input and speech output are enabled. If the sound meter 238 detects too much background noise, such that the speech engine 226 has difficulty with speech recognition from audio inputs, the mobile device 102 can temporarily disable speech input. If the user of the mobile device 102 is having difficulty hearing outputs via the audio device 106, the user can request to temporarily disable speech output. When speech is temporarily disabled, subsequent inputs can still occur via the camera 110 and subsequent outputs can still occur via the transparent display 104. Based on the user's preferences, the user of the mobile device 102 may have previously selected for some outputs to occur via the transparent display 104 and some outputs to occur via the audio device's 106 speaker 254. If the user of the mobile device 102 temporarily disables speech, all outputs may occur via the transparent display 104, even outputs previously occurring via the audio device's 106 speaker 254.

Likewise, the intensity of the distribution center light detected by the camera 110 may be too bright for inputs via the camera 110 and outputs via the transparent display 104. The mobile device 102 can respond to the excessively bright light by conducting all subsequent inputs via the audio device's 106 microphone 210 and all subsequent outputs via the audio device's 106 speaker 254. When the background sound or the detected light returns to a level that enables the previous input and output selections, the mobile device 102 can either automatically revert to the selections or provide the user of the mobile device 102 with the option of reverting to the selections.

Figure 6:
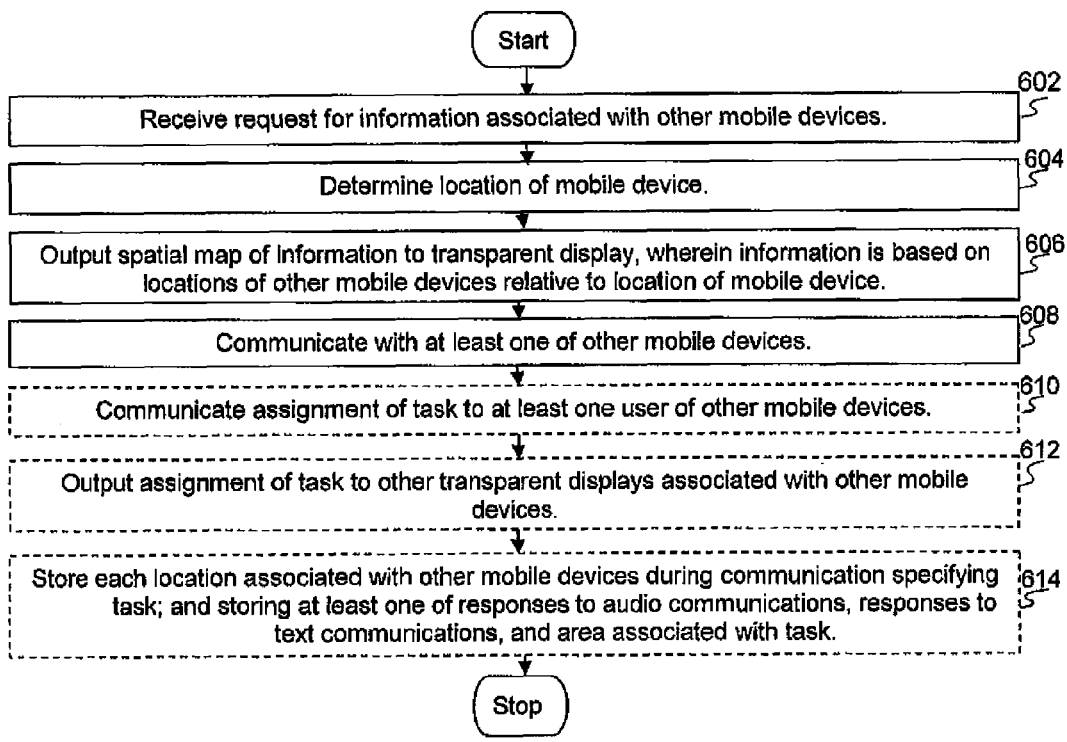
FIG. 6 shows a flowchart of a method for communication between mobile devices according to some embodiments of the present disclosure.

FIG. 6 is a flowchart illustrating a method for communication between mobile devices 102 according to some embodiments of the present disclosure. A primary mobile device 102 can use the method for communication with other mobile devices 102 in various environments, such as bookstores, distribution centers, grocery stores, and warehouses, for example, and assign tasks to the users of other mobile devices 102. For the purposes of the present disclosure, the term primary mobile device 102 is used to distinguish the role of one of the mobile devices 102 assigning tasks to other mobile devices 102. In an embodiment, the role of the primary mobile device 102 may be performed by any of the mobile devices 102 at any time. In another embodiment, the role of the primary mobile device 102 may be limited to the mobile device 102 associated with a supervisor, a group leader, a shift leader, or other privileged user. In an embodiment, the primary mobile device 102 role may be password protected or otherwise authenticated.

In box 602, the primary mobile device receives a request for information associated with other mobile devices. For example, the mobile device 102 can receive a request via the audio device's 106 microphone 210, the pointer 208, the keyboard 206, or the camera 110 for information. The mobile device 102 can use the speech engine 226 to execute speech recognition software for recognizing requests input via the audio device's 106 microphone 210. The mobile device 102 can also input requests submitted by the user's supervisor via the pointer 208 or the keyboard 206 that communicate with the supervisor's computer. The request may specify a maximum distance between the locations associated with the other mobile devices 102 and the location of the primary mobile device 102, such as the request for the location of all mobile devices 102 within 25 feet of the user's location 302.

Additionally, the mobile device 102 can use the gestures engine 222 to execute gesture recognition software for recognizing images of gestures captured by the camera 110. For example, the gestures engine 222 can determine that the location of the user's index finger, as captured by the camera 110, is aligned with the location of an input option projected on the transparent display 104, such that to the user's perspective the user's index finger appears to be touching the projected input option. In this situation, which may occur when background noise is too loud for the speech engine 226 to accurately recognize speech commands, the gestures engine 222 enables the mobile device 102 to execute the input option identified by the user's index finger. The transparent display 104 can capture gestures by alternative means, such as by detecting a head nod by the user wearing the transparent display 104, or any other motion detected by the mobile device 102.

In box 604, the mobile device determines the location of the mobile device. For example, the mobile device 102 determines its location using at least one of a radio frequency identification technology, a global positioning system (GPS) technology, a forward link triangulation technology, a hybrid technology, and a motion detector technology. The mobile device 102 can determine its location, for example, using radio frequency identification technology by identifying electronic tags of nearby items in a distribution center, referencing the location database 248 to determine where these items are located in the distribution center, and fixing the location of the mobile device 102 in the distribution center based on the relationship between the locations of the mobile device 102 and the identified items. The identified items can be items stored in a distribution center, fixed electronic tags specifically used as beacons for determining relative location in the distribution center, or combinations of items and fixed electronic tags.

The mobile device 102 can use a global positioning system technology (GPS) to fix the location of the mobile device 102. Global positioning system satellites transmit signals that are received by the mobile device 102. The mobile device 102 determines its position based on the different signals received from different satellites. The location accuracy is environment driven and dependant on the type of equipment used. The global positioning system technology is owned and operated by the U.S. Department of Defense, but is available for general use around the world.

The mobile device 102 can use forward link triangulation technology to determine its position based on the different radio frequency signals received from different cell towers, such as the cell tower 116 and other cell towers. In radio communications, a forward link is the link from a fixed location, such as the cell tower 116 to the mobile device 102. If the link includes a communications relay satellite, the forward link will consist of both an uplink from a base station to the satellite and a downlink from the satellite to the mobile device 102. Each serving cell tower broadcasts a system parameters information message to the mobile device 102. This message includes the longitude and the latitude of the serving cell tower. The radius covered by serving cell towers vary greatly, from hundreds of meters in dense urban areas to 20 miles or more in rural environments. The forward link triangulation technology fixes the location of the mobile device 102 based on measurements taken of time and distance signals from nearby cell towers. The mobile device 102 reports the time and distance measurements to the wired network 118, then the wired network 118 triangulates a location fix of the mobile device 102 and reports the location fix back to mobile device 102. In general, more than three surrounding cell towers are preferred to triangulate an optimal location fix.

The mobile device 102 can use a hybrid technology to fix the location of the mobile device 102 based on a combination of other location fix technologies. For example, if the mobile device 102 is indoors but close to a window, the global positioning system technology in combination with a cell tower location technology can calculate the location fix for the mobile device 102. When the mobile device 102 is indoors, the mobile device 102 may receive signals from an insufficient number of satellites to determine the position of the mobile device 102. However, the hybrid technology can combine the signals from the insufficient number of satellites with the cell tower location identified by the channel length modulation to calculate a hybrid location fix for the mobile device 102.

The mobile device 102 can also use motion detector technology to fix the location of the mobile device 102. For example, the motion detector 102 fixes its location as the south end of aisle 5 in a distribution center based on forward link triangulation technology. If the motion detector 234, functioning as a pedometer, detects that the user of the mobile device 102 has walked 15 meters due north, the mobile device 102 combines the information from forward link triangulation technology and motion detector technology to fix the current location of the mobile device 102 as 15 meters north from the south end of aisle 5 in the distribution center. If the mobile device 102 already has the requested information stored in memory, the mobile device 102 is ready to output a spatial map of information based on the location of the mobile device 102. If the mobile device 102 does not have the requested information stored in memory, the mobile device 102 requests the information for a spatial map of information from the content server 122, where the mobile device 102 provides the most recent location of the mobile device 102 to the content server 122.

In box 606, the primary mobile device outputs a spatial map of information to the transparent display, wherein the information is based on locations of the other mobile devices relative to the location of the primary mobile device 102. For example, the primary mobile device 102 outputs the second graphical user interface 400 in FIG. 4, which includes locations 304-312 of the other mobile devices 102, the map 402 for the bookstore, and additional information, such as the additional information 410, for each of the other mobile devices 102. The transparent display 104 can use the digital compass 214 to determine an orientation of the transparent display 104 such that the locations 304-312 projected on the transparent display 104 can be based on the user's location 302. The mobile device 102 may output a revised spatial map of the information to the transparent display 104 based on the multiple distance requests, such as the first graphical user interface 300, which displays the ranges 314-320 for four different distance requests. The information may also include menu options such as the input options 504 to 512 depicted by the third graphical user interface 500.

In box 608, the primary mobile device communicates with at least one of the other mobile devices. For example, the user of the primary mobile device 102 communicates with Bob's mobile device 102. The user of the primary mobile device 102 may make a selection to communicate by speaking the name of any mobile device 102 user by specifying a range in which a selected mobile device 102 is located, or by aligning a finger or pointer with a projected image on the transparent display 104, such that the camera 108 detects the finger pointing to a selected mobile device 102 location. In another example, the audio device 106 for the primary mobile device 102 receives the user's spoken selection to communicate with "all staff within 50 feet," which includes the mobile devices 102 at Ed's location 312, Chris' location 308, and Bob's location 306.

The camera 110 can capture an image of an item and send the image to the primary mobile device 102, whereby the primary mobile device 102 may communicate the image of the item to other mobile devices 102. The users of the other mobile devices 102 may view the image of the item to assist the user of the primary mobile device 102 to identify the item. For example, if a customer wants to purchase a man's shirt that is missing a price tag, the user of the primary mobile device 102 may request information about mobile devices 102 within 25 feet of the men's clothing department. Using the additional information 410 for the mobile devices 102 near the men's clothing department, the user of the primary mobile device 102 identifies the mobile device 102 of a staff member who sells men's clothing according to the additional information 410. The user of the primary mobile device 102 captures an image of the man's shirt with the camera 110, and sends the image of the shirt to the mobile device 102 of the staff member who sells men's clothing so that the staff member may locate a similar shirt and may communicate the price to the user of the primary mobile device 102. Additionally, the camera 110 may capture an image of an item and compare the captured image to stored images in the database 242 to identify the item.

In box 610, the primary mobile device communicates an assignment of a task to at least one user of the other mobile devices. For example, the user of the primary mobile device 102 communicates with the mobile device 102 at Bob's location 306, requesting Bob to assist a customer in finding a book about American history. A communication may be a text communication, an audio communication, a text communication that is converted to an audio communication, or an audio communication that is converted to a text communication. Continuing the example, when the user of the primary mobile device 102 makes an audio request for Bob to help find the history book, the mobile device 102 at Bob's location 306 may communicate this audio request through the audio device 106 or convert the audio request to a text message that is displayed on the transparent display 104. Alternatively, the user of the primary mobile device 102 may enter a text message for Bob to help find the history book, and the mobile device 102 at Bob's location 306 may display this text message to the transparent display 104 or convert the text message to an audio message that is communicated on the audio device 106.

The user of the primary mobile device 102 may specify a user of the other mobile devices 102 for task assignment, communicate an assignment of the task to a user of the other mobile devices 102 that responds to an audio communication specifying the task, communicate an assignment of the task to a user of the other mobile devices 102 that responds to a text communication specifying the task, or communicate an assignment of the task to a user of the other mobile devices 102 who enters an area associated with the task. For example, the user of the mobile device 102 may assign the history book task to Bob because Bob is familiar with the section of the bookstore that stocks history books. In another example, the user of the primary mobile device 102 communicates an audio request to multiple mobile devices 102, requesting help in shelving fallen books. The primary mobile device 102 assigns the shelving task to Chris' mobile device 102 when Chris responds by an audio message or a text message to the audio shelving request. In yet another example, the user of the primary mobile device 102 communicates a text message to multiple mobile devices 102, requesting help in shelving fallen books. The primary mobile device 102 assigns the shelving task to Chris' mobile device 102 when Chris responds by an audio message or a text message to the text message request for shelving help. In one more example, the user of the mobile device 102 requests help with the price of a book in the history section of the bookstore. The primary mobile device 102 assigns the history book pricing request to the first user of the other mobile devices 102 who is within 20 feet of the section of the bookstore associated with history books.

The user of the primary mobile device 102 may specify the user of the other mobile devices 102 for task assignment by identifying a user of the other mobile devices 102 who is spatially closest to the area associated with the task, wherein spatially closest is based on either the closest geometric distance or the closest path. For example, if the user of the mobile device 102 makes an audio request for help with a computer at a kiosk from the closest staff member, the mobile device 102 assigns the computer help task to Chris because Chris' location 308 is 35 feet from the user's location 302, in comparison to Bob's location 306, which is approximately 40 feet from the user's location 302, while Ed is on break. In another example, the mobile device 102 assigns the computer help task to Bob because the path 406 from Bob's location 306 is approximately 40 feet from the user's location 302, in comparison to the path 408 from Chris' location 308, which is approximately 45 feet from the user's location 302.

In box 612, the primary mobile device optionally outputs an assignment of a task to other transparent displays associated with other mobile devices. For example, the primary mobile device 102 outputs a text message to other transparent displays 104 associated with other mobile devices 102, where the text message indicates the assignment of the computer help task to Bob. Upon receipt of this text message, Ann, Chris, Donna, and Ed each know that they are not responsible for helping the user of the mobile device 102 with the computer at the kiosk.

In box 614, data is stored, where the data may include each location associated with the other mobile devices 102 during a communication specifying a task, responses to audio communications, responses to text communications, and an area associated with the task. For example, the communication server 120 stores data that assists a supervisor in evaluating coworkers' responses to requests. The stored data may indicate where each of the mobile devices 102 was located when a request was communicated for assistance, which of the mobile devices 102 responded to the audio communications and the text communications, and any areas associated with the request. For example, the supervisor may review stored data that indicates that Donna responded to the most requests, Bob responded to the most audio requests, and Chris responded to the most text message requests. The stored data may also indicate that Ann did not respond to requests for assistance associated with her area of the store because she was troubleshooting a failed computer system in the store. The stored data may also indicate that Ed did not respond to two requests for the closest staff member when he was the closest staff member because Ed was in the restroom 404 at the time the requests were made.

Figure 7:
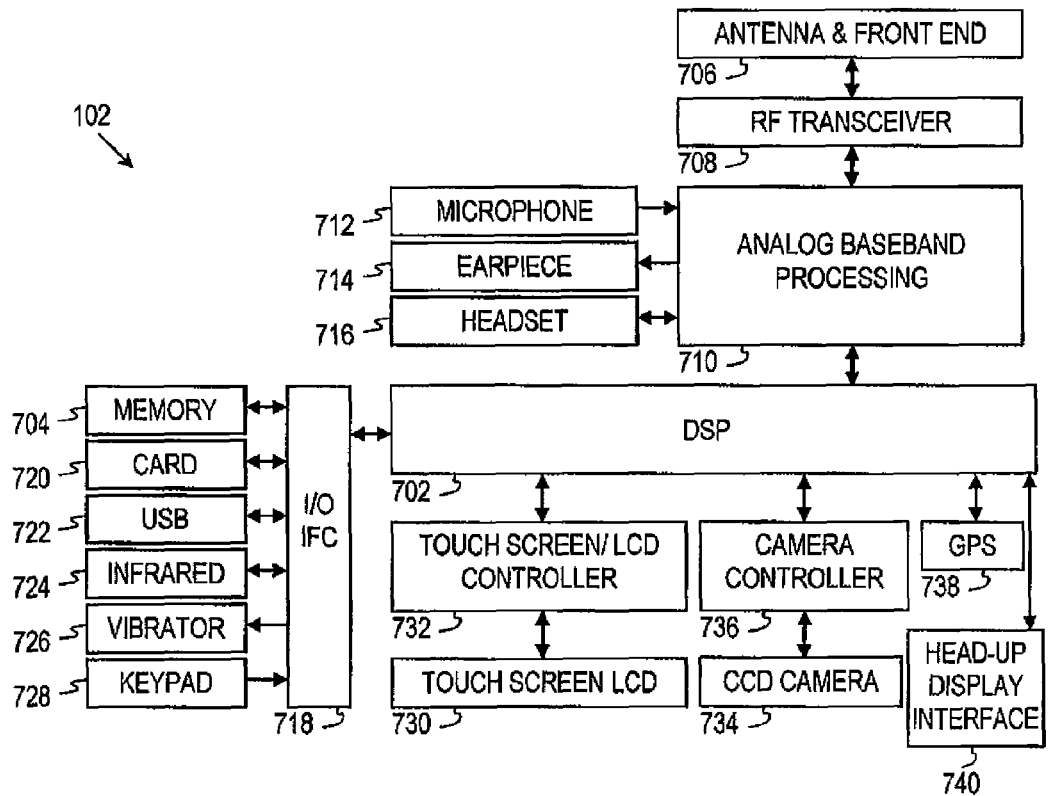
FIG. 7 shows a block diagram of an illustrative mobile device according to some embodiments of the present disclosure.

FIG. 7 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 702 and a memory 704. As shown, the mobile device 102 may further include an antenna and front end unit 706, a radio frequency (RF) transceiver 708, an analog baseband processing unit 710, a microphone 712, an earpiece speaker 714, a headset port 716, an input/output interface 718, a removable memory card 720, a universal serial bus (USB) port 722, an infrared port 724, a vibrator 726, a keypad 728, a touch screen liquid crystal display (LCD) with a touch sensitive surface 730, a touch screen/LCD controller 732, a charge-coupled device (CCD) camera 734, a camera controller 736, a global positioning system (GPS) sensor 738, and a head-up display interface 740. In an embodiment, the mobile device 102 may include another kind of display that does not provide a touch sensitive screen. In an embodiment, the DSP 702 may communicate directly with the memory 704 without passing through the input/output interface 718.

The DSP 702 or some other form of controller or central processing unit operates to control the various components of the mobile device 102 in accordance with embedded software or firmware stored in memory 704 or stored in memory contained within the DSP 702 itself. In addition to the embedded software or firmware, the DSP 702 may execute other applications stored in the memory 704 or made available via information carrier media, such as portable data storage media like the removable memory card 720, or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The antenna and front end unit 706 may be provided to convert between wireless signals and electrical signals, enabling the mobile device 102 to send and receive information from a cellular network or some other available wireless communications network or from a peer mobile device 102. In an embodiment, the antenna and front end unit 706 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 706 may include antenna tuning and/or impedance matching components, RF power amplifiers, and/or low noise amplifiers.

The RF transceiver 708 provides frequency shifting, converting received RF signals to baseband and converting baseband transmit signals to RF. In some descriptions, a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 710 and/or the DSP 702 or other central processing unit. In some embodiments, the RF transceiver 708, portions of the antenna and front end 706, and the analog baseband processing unit 710 may be combined in one or more processing units and/or application specific integrated circuits (ASICs).

The analog baseband processing unit 710 may provide various analog processing of inputs and outputs, for example analog processing of inputs from the microphone 712 and the headset port 716 and outputs to the earpiece speaker 714 and the headset port 716. To that end, the analog baseband processing unit 710 may have ports for connecting to the built-in microphone 712 and the earpiece speaker 714 that enable the mobile device 102 to be used as a cell phone. The analog baseband processing unit 710 may further include a port for connecting to a headset or other hands-free microphone and speaker configurations. The analog baseband processing unit 710 may provide digital-to-analog conversion in one signal direction and analog-to-digital conversion in the opposing signal direction. In some embodiments, at least some of the functionality of the analog baseband processing unit 710 may be provided by digital processing components, for example by the DSP 702 or by other central processing units.

The DSP 702 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (COMA) technology application, for a transmitter function the DSP 702 may perform modulation, coding, interleaving, and spreading, and for a receiver function the DSP 702 may perform despreading, deinterleaving, decoding, and demodulation. In another embodiment, for example in an orthogonal frequency division multiplex access (OFDMA) technology application, for the transmitter function the DSP 702 may perform modulation, coding, interleaving, inverse fast fourier transforming, and cyclic prefix appending, and for a receiver function the DSP 702 may perform cyclic prefix removal, fast fourier transforming, deinterleaving, decoding, and demodulation. In other wireless technology applications, yet other signal processing functions and combinations of signal processing functions may be performed by the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the mobile device 102 to function as a peripheral device to exchange information with a personal computer or other computer system. The infrared port 724 and other optional ports such as a Bluetooth interface or an IEEE 802.11 compliant wireless interface may enable the mobile device 102 to communicate wirelessly with other nearby mobile devices and/or wireless base stations.

The input/output interface 718 may further connect the DSP 702 to the vibrator 726 that, when triggered, causes the mobile device 102 to vibrate. The vibrator 726 may serve as a mechanism for silently alerting the user to any of various events such as an incoming call, a new text message, and an appointment reminder.

The keypad 728 couples to the DSP 702 via the input/output interface 718 to provide one mechanism for the user to make selections, enter information, and otherwise provide input to the mobile device 102. Another input mechanism may be the touch screen LCD 730, which may also display text and/or graphics to the user. The touch screen LCD controller 732 couples the DSP 702 to the touch screen LCD 730.

The CCD camera 734 enables the mobile device 102 to take digital pictures. The DSP 702 communicates with the CCD camera 734 via the camera controller 736. The GPS sensor 738 is coupled to the DSP 702 to decode global positioning system signals, thereby enabling the mobile device 102 to determine its position. In another embodiment, a camera operating according to a technology other than charge-coupled device cameras may be employed. The heads-up display interface 740 enables communication between the mobile device 102, the transparent display 104, the audio device 106, and the camera 110. Various other peripherals may also be included to provide additional functions (e.g., radio and television reception).

Figure 8:
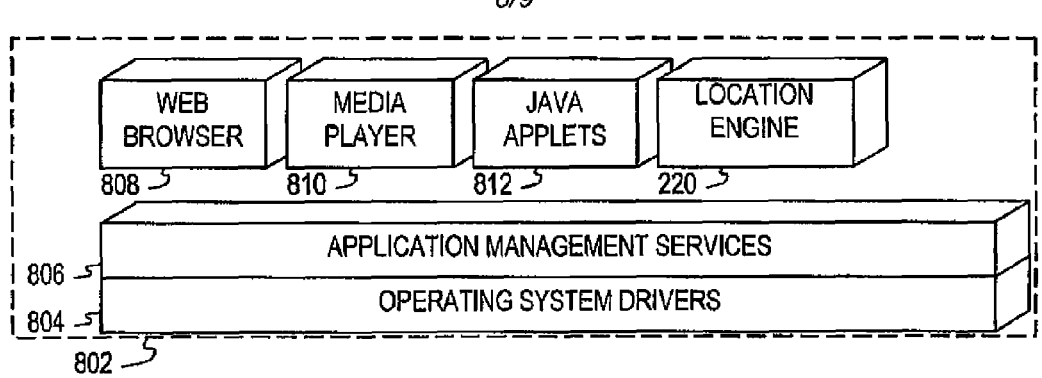
FIG. 8 shows a block diagram of an illustrative software configuration for a mobile device according to some embodiments of the present disclosure.

FIG. 8 illustrates a software environment 802 that may be implemented by the DSP 702. The DSP 702 executes operating system drivers 804 that provide a platform from which the rest of the software operates. The operating system drivers 804 provide drivers for the mobile device hardware with standardized interfaces that are accessible to application software. The operating system drivers 804 include application management services (AMS) 806 that transfer control between applications running on the mobile device 102. Also shown in FIG. 8 are a web browser application 808, a media player application 810, Java applets 812, and the location engine 220. The web browser application 808 configures the mobile device 102 to operate as a web browser, allowing a user to enter information into forms and select links to retrieve and view web pages. The media player application 810 configures the mobile device 102 to retrieve and play audio or audiovisual media. The Java applets 812 configure the mobile device 102 to provide games, utilities, and other functionality. These are further examples of content that may be provided by the content server 122. The location engine 220 application can execute a location fix technology for the mobile device 102.

Figure 9:
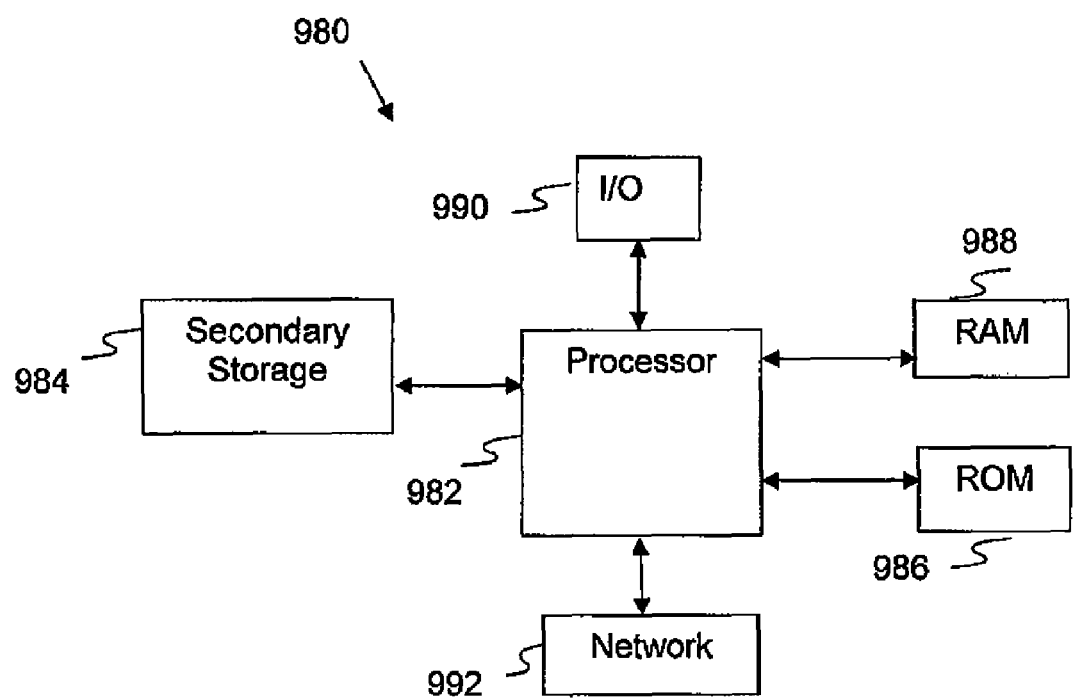
FIG. 9 illustrates an exemplary, general-purpose computer system suitable for implementing the several embodiments of the disclosure.

The system described above may be implemented on any general-purpose computer with sufficient processing power, memory resources, and network throughput capability to handle the necessary workload placed upon it. FIG. 9 illustrates an exemplary, general-purpose computer system such as the content server 122, suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) 990 devices, and network connectivity devices 992. The processor may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage. The RAM 988 is used to store volatile data and perhaps to store instructions. Access to both ROM 986 and RAM 988 is typically faster than to secondary storage 984.

I/O 990 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 992 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982, for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example, optical fiber, or in the air or free space. The information contained in the baseband signal or signal embedded in the carrier wave may be ordered according to different sequences as may be desirable for either processing or generating the information, or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk-based systems may all be considered secondary storage 984), ROM 986, RAM 988, or the network connectivity devices 992.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicated through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for communication between mobile devices, comprising:
   receiving, at a primary mobile device, selection criteria from a user via an input device, wherein the input device comprises at least one of an audio device or a camera;
   using the primary mobile device to request information associated with other mobile devices;
   identifying at least one of the other mobile devices that has information matching the selection criteria;
   determining a location of the primary mobile device and of the at least one of the other mobile devices that has information matching the selection criteria;
   outputting a spatial map of the location of the primary mobile device and the location of the at least one of the other mobile devices that has information matching the selection criteria to a transparent display, wherein the spatial map comprises see-through images that overlay the user's view of reality that allow the user to see objects beyond the transparent display;
   using the primary mobile device to communicate with the at least one of the other mobile devices; and
   storing data associated with the at least one of the other mobile devices in a non-transitory computer readable medium, wherein the data comprises the location of the at least one of the other mobile device at the time of the communication between the primary mobile device and the at least one of the other mobile devices.

2. The method of claim 1, wherein determining the location of the primary mobile device comprises determining the location of the primary mobile device relative to at least one of an item with an electronic tag and a geographically fixed electronic tag using at least one of a radio frequency identification technology, a global positioning system technology, a forward link triangulation technology, a hybrid technology, and a motion detector technology.

3. A method for communications with other users, comprising:
receiving, at a primary mobile device, selection criteria from a user via an input device;
using the primary mobile device to output a spatial map of information matching the selection criteria as a see-through image to a transparent display that allows a user of the primary mobile device to see objects beyond the transparent display, wherein the information is based on locations associated with other mobile devices used by each of the other users relative to the location of the primary mobile device;
selecting to communicate with at least one of the other mobile devices using the primary mobile device;
capturing an image of an item related to an assignment of a task using a camera associated with the primary mobile device, wherein the camera is configured to capture the image of the item viewable through the transparent display of the primary mobile device; and
communicating the assignment of the task and the image of the item to at least one other transparent display associated with one of the other mobile devices using the primary mobile device.

4. The method of claim 3, wherein communicating the assignment of the task comprises at least one of specifying one of the other users of the other mobile devices for task assignment, communicating the assignment of the task to one of the other users of the other mobile devices that responds to an audio communication specifying the task, communicating the assignment of the task to one of the other users of the other mobile devices that responds to a text communication specifying the task, and communicating the assignment of the task to one of the other users of the other mobile devices who enters an area associated with the task.

5. The method of claim 4, wherein specifying one of the other users of the other mobile devices for task assignment comprises identifying one of the other users of the other mobile devices who is spatially closest to the area associated with the task, wherein spatially closest is based on one of closest geometric distance and closest path.

6. The method of claim 4, further comprising:
storing each location associated with the other mobile devices during a communication specifying the task; and
storing at least one of the responses to audio communications, the responses to text communications, and the area associated with the task.

7. The method of claim 3, further comprising selecting to communicate with at least one of the other mobile devices based on an audio specification of maximum distance between the other mobile devices and the primary mobile device.

8. The method of claim 3, wherein a communication is at least one of a text communication, an audio communication, a text communication that is converted to an audio communication, and an audio communication that is converted to a text communication.

9. The method of claim 1, wherein the selection criteria includes one of a capability of a user of one of the other mobile devices, a role of a user of one of the other mobile devices, a location criteria of one of the other mobile devices, an activity status of a user of one of the other mobile devices, and proximity of one of the mobile devices to an item in an environment, wherein the environment is one of a retail environment, a distribution center, and a warehouse.

10. The method of claim 9, wherein the location criteria of one of the other mobile devices is one of proximity of one of the other mobile devices to the primary mobile device, proximity of one of the other mobile devices to an item in an environment, spatial location of one of the other mobile devices in the environment, a path distance between one of the other mobile devices and the primary device, and a path distance between one of the other mobile devices and the item in the environment, wherein the environment is one of a retail environment, a distribution center, and a warehouse.

11. The method of claim 1, further comprising receiving an image captured by one of the other mobile devices and outputting the image captured by one of the other mobile devices as a virtual image to the transparent display.

12. The method of claim 1, further comprising:
outputting a plurality of options to the transparent display, executing one of the plurality of options based on receiving a gesture from the user of the primary mobile device.

13. The method of claim 12, wherein receiving a gesture comprises:
capturing an image of an appendage of the user; and
determining the location of the appendage beyond the transparent display relative to the plurality of options on the transparent display.

14. The method of claim 1, further comprising;
capturing an image of an item related to an assignment of a task; and
communicating the assignment of the task and the image of the item to at least one other transparent display associated with the at least one of the other mobile devices using the primary mobile device.

15. The method of claim 3, wherein the information includes at least one of a mobile device communication availability, mobile device user function, mobile device user skill level, mobile device user current task, and mobile device user task load.

16. The method of claim 15, wherein the mobile device communication availability indicates whether a user of one of the other mobile devices is in a mode that enables communication or a mode that disables communication.

17. The method of claim 15, wherein the mobile device user function indicates a job title or a position of a user associated with one of the other mobile devices.

18. The method of claim 15, wherein the mobile device user skill level indicates the capabilities of a user associated with one of the other mobile devices.

19. The method of claim 15, wherein the mobile device user current task indicates that a user associated with one of the other mobile devices is one of currently responding to a request for assistance from another coworker, conducting inventory, and on a scheduled break.

20. The method of claim 15, wherein the mobile device user task load is determined based on one of a mobile device user conversation detected by another audio device associated with one of the other mobile devices and a user task load selection.

* * * * *